2,775,579
LOW TEMPERATURE POLYMERIZATION PROCESS AND COMPOSITION

Michael Erchak, Jr., Morris Township, Morris County, and Robert J. Blazek, Morris Plains, N. J., assignors to Allied Chemical & Dye Corporation, New York, N. Y., a corporation of New York No Drawing. Application October 15, 1952,
Serial No. 314,956

8 Claims. (Cl. 260—88.7)

This invention relates to catalyzed addition polymerization of monomers defined below and to polymerizable compositions comprising said monomers and the catalyst of our invention.

In particular this invention relates to use of a catalyst which initiates and maintains at high reaction rates polymerizations, including copolymerizations, at temperatures in the range between about 10° C. and about 40° C.; and relates to compositions comprising the monomers defined below and said catalyst.

Initiation of polymerization in the temperature range 10°–40° C. is of importance in applications of polymerizable compositions such as gluing, laminating, casting, coating, and modifying the character of earth, e. g. hardening soft ground. Completion of polymerization at these same temperatures is of interest for production of high polymers for synthetic rubbers, synthetic filaments, molding compositions, self-supporting films, etc., since polymerization carried out at these relatively low temperatures tends to form polymers having especially good properties for the above and related uses.

In accordance with our invention, compositions polymerizable at temperatures maintained within the range between about 10° and about 40° C. comprise (1) at least one polymerizable monomer having a terminal methylene group doubly bonded to a carbon atom having at least one of its two remaining valences satisfied by an electronegative group other than an oxy group, with substantially all of the polymerizable monomer being mono-ene monomer; (2) a hypochloride; (3) aqueous ammonia; (4) a cupric salt. Suitably an emulsifying agent active in water under alkaline conditions is also present.

By "electronegative" group is meant a group which tends more strongly than hydrogen to acquire electrons when combined with carbon, as shown by dipole moment measurements. By "oxy" group is meant any group attached through oxygen to the unsaturated carbon atom, such as methoxy, ethoxy, acetoxy etc., and by "mono-ene" monomer is meant a compound having one and only one point of carbon-to-carbon aliphatic unsaturation in the molecule, said unsaturation being a double bond.

Illustrative of the monomers which can be homopolymerized by our process and copolymerized with each other in all proportions to high molecular weight solid polymers are acrylonitrile, methyl acrylate, methyl methacrylate, calcium acrylate, vinylidene chloride, vinyl chloride and styrene.

Other types of unsaturated monomers such as specifically butadiene, ethylene, isobutylene, vinyl ethyl ether and vinyl acetate, which are ordinarily considered polymerizable and/or copolymerizable similarly to the monomers above cited, do not homopolymerize or copolymerize with each other or with e. g. acrylonitrile to any substantial extent at least in reasonable times such as 24 hours under our conditions of catalyst and temperature and under suitable pressures to maintain a liquid phase.

The following examples are illustrative of our invention, but the invention is not to be understood as limited to the details of these examples. References to parts hereinafter are parts by weight. Room temperatures referred to below are about 20°–25° C.

The various compositions employed in the examples were polymerized by the following method:

A dispersion was formed in water of the polymerization reaction mixture of monomer, hypochlorite, ammonium salt, aqueous ammonia solution and cupric salt by introducing into water and thoroughly mixing the components other than hypochlorite at the desired reaction temperature, then introducing the hypochlorite component while stirring and passing a slow stream of nitrogen through the system to minimize any effects due to atmospheric oxygen, meanwhile maintaining temperature of the dispersion in the range between about 10° C. and about 40° C. at least until polymerization began. The polymer was isolated by filtering it off at the end of the desired reaction period, washing it with distilled water followed by methanol, and drying it to constant weight at 55° C. in an air circulating oven.

Example 1

At room temperature, 1200 parts of water, 300 parts of acrylonitrile, 5 parts of ammonium chloride, 10 parts of 28% ammonia solution in water, and 2 parts of cupric sulfate pentahydrate were thoroughly mixed as above described and 10 parts of commercial 5.25% sodium hypochlorite solution in water were then added as above described. Polymerization started after a few minutes and in one hour at least about 75% of the acrylonitrile had been polymerized to solid polymer.

Example 2

Using the same technique as in the foregoing example, about 1500 parts of water, 250 parts of acrylonitrile, 2.5 parts of ammonium sulfate, 9 parts of 28% ammonia solution in water, and 1 part of cupric sulfate pentahydrate were mixed at 22° C. and about 30 parts of commercial 5.25% sodium hypochlorite solution in water were added. The mixture was stirred intermittently enough to maintain dispersion of the monomer in water. Polymerization started after about 5 minutes and was about 95% complete to solid polymer in 1 hour. Temperature rose as the reaction got under way, reaching a maximum of about 48° C.

Example 3

Using the same technique as in the foregoing examples, about 2000 parts of water, 20 parts of Igepon-T (a sulfonated long chain carboxylic acid amide emulsifying agent), 250 parts of methyl acrylate, 2.5 parts of ammonium sulfate, 9 parts of 28% ammonia solution in water, and 1.5 parts of cupric sulfate pentahydrate were mixed at 22° C. and about 30 parts of commercial 5.25% sodium hypochlorite solution in water were added. The mixture was continuously stirred. Polymerization began after about ½ hour and was about 75% complete to solid polymer in about 1.5 hours from the end of the ½ hour induction period. Temperature rose to a maximum of about 31° C.

Example 4

Using the same technique as in the foregoing examples, about 2000 parts of water, 20 parts of "Nacconol" NRSF (an alkyl aryl sulfonate emulsifying agent), 250 parts of vinylidene chloride, 2.5 parts of ammonium chloride, 9 parts of 28% ammonia solution in water, and 1.5 parts of cupric sulfate pentahydrate were mixed at 22° C. and about 30 parts of commercial 5.25% sodium hypochlorite solution in water were added. Polymerization to a solid polymer was about 88% complete in 5 hours.

Example 5

(a) Using the same technique as in the foregoing examples, about 3000 parts of water, 20 parts of "Nacconol" NRSF alkyl aryl sulfonate emulsifying agent, 425 parts of acrylonitrile, 75 parts of methyl methacrylate, 3 parts of ammonium sulfate, 9 parts of 28% ammonia solution in water, and 1 part of cupric sulfate pentahydrate were mixed at about 30° C. and about 30 parts of commercial 5.25% sodium hypochlorite solution in water were added. Polymerization began after about 15 minutes. Temperatures were maintained in the range 30°–35° C. Polymerization to a solid copolymer was about 85% complete in 2 hours.

The copolymer contained by analysis about 80% by weight of acrylonitrile. It was soluble in dimethyl formamide, in which it showed viscosity number of 4.91 at 1.25% solids and 40° C., where viscosity number is defined as (viscosity of solution divided by viscosity of solvent) minus unity, all divided by concentration of solution expressed as grams of polymer per 100 cc. of solvent. Fibers spun from solution of this copolymer in dimethyl formamide were found to be of good tensile strength, flexibility, elasticity, etc. and comparable to known acrylonitrile-based fibers.

(b) When methyl acrylate was substituted for methyl methyacrylate using the technique above described and essentially the same conditions as in part (a) of this example except that ammonium sulfate amounted to about 2.5 parts and temperatures were initially 22° C. and were allowed to rise to 44° C., polymerization began about 10 minutes after addition of the hypochlorite solution and was about 88% complete to solid polymer in 1 hour after the 10 minutes induction period ended.

Example 6

(a) Using essentially the same technique and conditions as in Example 5 (a) except that styrene was substituted for the methyl methacrylate and ammonium chloride was substituted for the ammonium sulfate of that example, polymerization started after about 7 minutes and was about 86% complete to solid polymer in 2 hours from the end of the 7 minute induction period.

The copolymer contained by analysis about 80% by weight of acrylonitrile. It was soluble in dimethyl formamide, in which it showed viscosity number, defined as in Example 5 (a) of 4.66 at 1.25% solids and 40° C. Fibers spun from dimethyl formamide solution had good tensile strength, flexibility, elasticity, etc. and were comparable to known acrylonitrile-based fibers.

(b) Using essentially the same technique and conditions as in part (a) of this example but employing the three monomers acrylonitrile, methyl methacrylate and styrene in 85:10:5 weight ratio, a yield of 88% was obtained at room temperature. The resulting terpolymer was soluble in dimethyl formamide, in which it showed a viscosity of 3.56. Fibers prepared by spinning from dimethyl formamide solution were comparable to the above and had a tensile strength of 5.17 g./denier.

(c) When acrylonitrile, styrene and 2-vinyl pyridine were employed in 82.5:12.5:5 weight ratio in the procedure of part (a) of this example, a fiber with relatively good dyeability properties, as compared to acrylonitrile-based fibers generally, was obtained. The resulting copolymer had a viscosity number of 3.89. Fibers tested 5 g./d.

Example 7

(a) Fifty grams monomeric calcium acrylate was dissolved in 200 gms. water, filtered and introduced into a mixture consisting of 1.0 gm. $(NH_4)_2SO_4$, 0.1 gm. $CuSO_4.5H_2O$, 250 ml. distilled water, and 50.0 ml. aqueous ammonia (28%), then 6.0 ml. of commercial aqueous NaOCl (5.25%) was added. After an induction period of 2 to 3 minutes, the reaction temperature began to rise spontaneously indicating occurrence of polymerization. It was maintained at 30° C. (by cooling frequently) for a period of one hour. The product was added to 300 ml. acetone, filtered, washed with water and acetone and dried. The yield of polymer was 92.4%.

(b) A paste was made by adding 0.25 ml. commercial aqueous NaOCl (5.25%) to a mixture of 1.13 gms. calcium acrylate, 15.0 gms. common soil, 2.2 ml. water, 0.02 gm. $(NH_4)_2SO_4$, 0.002 gm. $CuSO_4.5H_2O$, and 1.5 ml. aqueous ammonia (28%). Polymerization commenced within one minute after the addition of the sodium hypochlorite solution, and appeared to be essentially complete in 5 to 15 minutes. A hard and tenacious material had formed upon standing for one hour or longer.

(c) Like results to those of part (b) above were obtained when 0.1 gm. of bleaching powder $[Ca(OCl)_2.4H_2O]$ was substituted for the 0.25 ml. of commercial aqueous sodium hypochlorite of part (b).

Reaction rates and induction periods in polymerizations in accordance with our invention vary with factors such as ratios of catalyst ingredients to each other and to monomer; nature of monomers; ratio of monomers when more than one monomer is used; water monomer ratio; presence of an emulsifying agent; rate of stirring; and presence of oxygen in contact with the reaction mixture. Considerable variations, along the lines illustrated in the examples, can be made with respect to these factors without destroying the advantages of our invention.

Ammonium ion present in accordance with our invention cooperates with hypochlorite ion to establish a redox catalyst system. Such system can be established using only ammonium hydroxide (aqueous ammonia) as source of the ammonium ion; but inclusion of an ammonium salt such as sulfate and chloride is preferred as giving products of more nearly homogeneous composition having better all-around physical properties.

Induction periods appear especially sensitive to proportion of cupric salt, being extremely long unless effective amounts of cupric salt are present and passing through a minimum as cupric ion:ammonia mol ratio increases upward through minimum effective values. Preferred mol ratios of cupric salt:stoichiometric molar quantity of ammonia introduced in the aqueous ammonia solution are between about 1:400 and about 1:10. Based on 100 mols of monomer introduced, preferred ranges for quantities of the remaining catalyst ingredients introduced are hypochlorite ion in the hypochlorite salt 0.02 to 2 mols, ammonium ion in the ammonium salt 0.03 to 3 mols, stoichiometric ammonia in the aqueous ammonia solution 0.3 to 30 mols. Preferred ratios of water:monomer are in the range between about 2:1 and about 10:1 by weight.

The possibility of adjusting the induction period is an advantage of our compositions and process since there can thus be established a time interval for working the composition before it has begun to polymerize or "set." Thus for example the catalyst, in absence of the cupric salt, dissolved or otherwise dispersed in a medium which can contain or consist of part or all of the monomers, can be applied to a surface to be coated; and then the cupric salt dispersed in the same or a different medium can be applied at one point on the surface whereupon polymerization will start almost immediately and progress over the surface.

Additional ingredients besides monomers, catalyst, water, emulsifying agent if desired, etc., can be employed in our compositions, such as thickeners, tackifiers, fillers, pigments and the like and can be present in either or both of the above mentioned dispersions or solutions of catalyst components and copper salt.

The polymerization reactions above outlined are exothermic. Accordingly such polymerizations initiated in the temperature range 10°–40° C. will develop higher temperatures during the course of the polymerization, unless the cooling capacity of the system is adequate to remove heat at substantially the rate at which it is generated. In some cases, at least a moderate temperature rise will not be objectionable.

If close control of temperature is desired, temperatures can be controlled during polymerizations in accordance with our process by conducting the polymerization in presence of a diluent such as water or a solvent for the monomers and by adding gradually at least one of the catalyst components with or without further monomer, e. g. gradually adding the ammonium salt-aqueous ammonia-cupric salt catalyst component in dilute aqueous solution to a reaction mixture containing the monomer ingredient and sodium hypochlorite.

Another method of using our catalysts and compositions is as initiators of polymerization which is maintained by a less active catalyst, after temperatures have risen spontaneously to a point where the less active catalyst is effective. Thus a monomer-catalyst composition inactive at room temperature can be applied to a surface, and our catalyst can be incorporated locally or throughout in amounts initiating polymerization at room temperatures, and maintaining it until spontaneous temperature rise is sufficient to activate the supplementary catalyst which completes the reaction at a suitable rate.

We claim:

1. Composition which polymerizes at temperatures maintained within the range between about 10° C. and about 40° C. comprising (1) at least one polymerizable monomer having a terminal methylene group doubly bonded to a carbon atom having at least one of its two remaining valences satisfied by an electronegative group other than an oxy group, with substantially all of the polymerizable monomer being mono-ene monomer; (2) a hypochlorite in amounts such that the molar ClO content thereof, i. e. the hypochlorite ion therein, is in the range between about 0.02 mol and about 2 mols per 100 mols of monomer introduced into the composition; (3) aqueous ammonia in amounts such that the total molar $NH_3$ content thereof, as such and in combined form as $NH_4^+$ ions and as $NH_4OH$ molecules, i. e. the stoichiometric molar quantity of ammonia in the aqueous ammonia solution, is in the range between about 0.3 mol and about 30 mols per 100 mols of monomer introduced into the composition; (4) a cupric salt in amounts such that the mol ratio of the cupric salt:stoichiometric molar quantity of ammonia as above defined under item (3) is in the range between about 1:400 and about 1:10.

2. Composition as defined in claim 1 wherein the polymerizable monomer is at least one material of the group consisting of acrylonitrile, methyl acrylate, methyl methacrylate, calcium acrylate, vinylidene chloride, vinyl chloride and styrene.

3. Composition which polymerizes at temperatures maintained within the range between about 10° C. and about 40° C. consisting essentially of (1) at least one material of the group consisting of acrylonitrile, methyl acrylate, methyl methacrylate, calcium acrylate, vinylidene chloride, vinyl chloride and styrene; (2) a hypochlorite in amounts such that the molar ClO content thereof, i. e. the hypochlorite ion therein, is in the range between about 0.02 mol and about 2 mols per 100 mols of monomer introduced into the composition; (3) aqueous ammonia in amounts such that the total molar $NH_3$ content thereof, as such and in combined form as $NH_4^+$ ions and as $NH_4OH$ molecules, i. e. the stoichiometric molar quantity of ammonia in the aqueous ammonia solution, is in the range between about 0.3 mol and about 30 mols per 100 mols of monomer introduced into the composition; (4) a cupric salt in amounts such that the mol ratio of the cupric salt:stoichiometric molar quantity of ammonia as above defined under item (3) is in the range between about 1:400 and about 1:10; (5) an ammonium salt in amounts such that the molar $NH_4$ content thereof, i. e. the ammonium ion therein, is in the range between about 0.03 mol and about 3 mols per 100 mols of monomer introduced into the composition; and with the water in said composition present at weight ratio of water:monomer introduced into the composition in the range between about 2:1 and about 10:1.

4. Composition as defined in claim 3 wherein at least part of the polymerizable monomer is acrylonitrile, the hypochlorite is sodium hypochlorite, the ammonium salt is at least one material of the group consisting of ammonium chloride and ammonium sulfate and the cupric salt is cupric sulfate.

5. In a process for polymerizing monomer which is substantially all mono-ene monomer and includes at least one monomer having a terminal methylene group doubly bonded to a carbon atom having at least one of its 2 remaining valences satisfied by an electronegative group other than an oxy group, the improvement which comprises maintaining in mutual contact at temperatures in the range between about 10° C. and about 40° C. (1) said monomer; (2) a hypochlorite in amounts such that the molar ClO content thereof, i. e. the hypochlorite ion therein, is in the range between about 0.02 mol and about 2 mols per 100 mols of monomer introduced into the composition; (3) aqueous ammonia in amounts such that the total molar $NH_3$ content thereof, as such and in combined form as $NH_4^+$ ions and as $NH_4OH$ molecules, i. e. the stoichiometric molar quantity of ammonia in the aqueous ammonia solution, is in the range between about 0.3 mol and about 30 mols per 100 mols of monomer introduced into the composition; (4) a cupric salt in amounts such that the mol ratio of the cupric salt:stoichiometric molar quantity of ammonia as above defined under item (3) is in the range between about 1:400 and about 1:10.

6. Process for polymerizing at least one monomer of the group consisting of acrylonitrile, methyl acrylate, methyl methacrylate, calcium acrylate, vinylidene chloride, vinyl chloride and styrene, which process comprises forming a dispersion in water comprising (1) said monomer; (2) a hypochlorite in amounts such that the molar ClO content thereof, i. e. the hypochlorite ion therein, is in the range between about 0.02 mol and about 2 mols per 100 mols of monomer introduced into the composition; (3) aqueous ammonia in amounts such that the total molar $NH_3$ content thereof, as such and in combined form as $NH_4^+$ ions and as $NH_4OH$ molecules, i. e. the stoichiometric molar quantity of ammonia in the aqueous ammonia solution, is in the range between about 0.3 mol and about 30 mols per 100 mols of monomer introduced into the composition; (4) a cupric salt in amounts such that the mol ratio of the cupric salt:stoichiometric molar quantity of ammonia as above defined under item (3) is in the range between about 1:400 and about 1:10; (5) an ammonium salt in amounts such that the molar $NH_4$ content thereof, i. e. the ammonium ion therein, is in the range between about 0.03 mol and about 3 mols per 100 mols of monomer introduced into the composition; and with the water in said composition present at weight ratio of water:monomer introduced into the composition in the range between about 2:1 and about 10:1 and maintaining temperature of the dispersion between about 10° C. and about 40° C. at least until polymerization begins.

7. Process as defined in claim 6 wherein at least part of the monomer polymerized is acrylonitrile, the hypochlorite salt is sodium hypochlorite, the ammonium salt is at least one material of the group consisting of ammonium chloride and ammonium sulfate and the cupric salt is cupric sulfate.

8. Process as defined in claim 7 wherein temperatures are maintained in the range between about 10° C. and about 40° C. throughout the polymerization period.

No references cited.